United States Patent [19]

Fujimura et al.

[11] Patent Number: 5,500,072
[45] Date of Patent: Mar. 19, 1996

[54] METHOD AND APPARATUS FOR RECYCLING METAL SHEET-THERMOPLASTIC RESIN LAMINATE COMPOSITES

[75] Inventors: Morio Fujimura; Hiroki Ban; Janusz Doniewski, all of Virginia Beach, Va.

[73] Assignee: Mitsubishi Chemical America, Inc., White Plains, N.Y.

[21] Appl. No.: 323,804

[22] Filed: Oct. 17, 1994

[51] Int. Cl.⁶ .................................................. B32B 35/00
[52] U.S. Cl. ........................ 156/344; 156/94; 156/584; 264/37; 29/403.3; 29/403.4; 29/426.1
[58] Field of Search ........................... 156/94, 344, 584; 264/37; 29/403.3, 403.4, 426.1, 426.4

[56] References Cited

U.S. PATENT DOCUMENTS

| 3,951,727 | 4/1976 | Greenberg | 156/344 X |
| 4,246,058 | 1/1981 | Reed | 156/584 X |
| 5,194,109 | 3/1993 | Yamada | 156/344 X |

FOREIGN PATENT DOCUMENTS

| 0031797 | 7/1981 | European Pat. Off. | 264/37 |
| 3823952 | 1/1990 | Germany | 156/344 |
| 51-30878 | 3/1976 | Japan | 156/344 |
| 51-70277 | 6/1976 | Japan | 156/584 |
| 56-44623 | 4/1981 | Japan | 156/584 |
| 56-70915 | 6/1981 | Japan | 264/37 |
| 59-142115 | 8/1984 | Japan | 156/344 |
| 3202409 | 8/1988 | Japan | 156/344 |

OTHER PUBLICATIONS

Austenfeld et al., IBM Technical Disclosure Bulletin, vol. 18 No. 12, *Foil Peeler,* May 1976.

*Primary Examiner*—Mark A. Osele
*Attorney, Agent, or Firm*—Oblon, Spivak, McClelland, Maier & Neustadt

[57] ABSTRACT

Metal sheet-thermoplastic resin laminate composites may be effectively separated into their component metal sheet(s) and thermoplastic resin sheet or core by first pressing the laminate composite through a pair of opposing rollers in which the roller(s) making contact with the metal surface(s) of the laminate composite is an embossing roller having projecting pins to obtain a laminate composite having a metal surface(s) with impressions and then heating the metal surface(s) of the laminate composite to separate the metal sheet(s) from the thermoplastic resin.

20 Claims, 4 Drawing Sheets

METHOD AND APPARATUS FOR RECYCLING METAL SHEET-THERMOPLASTIC RESIN LAMINATE COMPOSITES

BACKGROUND OF THE INVENTION

1. Field of the Invention

The present invention relates to novel methods and apparatus for recycling metal sheet-thermoplastic resin laminate composites such as ALPOLIC.

2. Discussion of the Background

Various composite laminates are known wherein a metal sheet is laminated on a thermoplastic synthetic resin sheet. U.S. Pat. No. 4,508,425 discloses a mirror manufactured by plating chromium on one surface of a metal sheet bonded to a composite sheet, made up of a synthetic resin sheet and the metal sheet, to form a mirror surface. The mirror may be worked to a desired shape and may be formed with a decorative pattern.

U.S. Pat. No. 4,560,623 discloses a specular product of bronze-like tone particularly suitable for use as a decorative material. The specular product uses, as a substrate, a composite board comprising a synthetic resin sheet and metal sheets laminated thereon, and includes a nickel deposit plated on the metal sheet and a specular film of Sn—Ni alloy electroplated on the nickel deposit using a specific electroplating bath.

U.S. Pat. No. 5,366,803 discloses metal-resin laminate composites in which the exterior surface of the metal sheet is coated with a layer of a cured polyvinylidene fluoride paint which is, in turn, coated with a layer of a cured fluorinated ethylene vinyl ether paint. These metal-resin laminate composites exhibit excellent weathering properties, may have a gloss of 25 to 80%, and may be bent to a sharp angle without cracking of the coating.

Such metal resin composites may have a structure in which a metal sheet is laminated to one surface of a thermoplastic resin sheet or, alternatively, a structure in which a metal sheet is laminated to both the top and bottom surfaces of a thermoplastic resin sheet.

Such laminates are useful for a number of architectural applications, because the laminates combine light weight with high strength. These laminates may be used as finished surfaces for all or portions of the interior or exterior surfaces of a building.

Because of the relative expense of the materials (metal sheet(s), and thermoplastic resin) and the high cost of disposal, it is desirable to recycle both the metal of the metal sheet and the thermoplastic resin of such composite laminates. It is especially desirable to recycle the "scraps" formed when large preformed sheets of such laminate composites are cut to the size required for a particular installation.

When the metal sheet(s) are composed of aluminum, it is important to separate the aluminum sheet(s) from the thermoplastic resin prior to melting the thermoplastic resin, because melting aluminum-thermoplastic resin laminates themselves leads to conversion of the aluminum to aluminum oxides and a poor yield of recovered aluminum. It is known to separate aluminum-polyethylene laminate composites by means of a two-stage process, in which the laminate is first heated and then pressed between picking rolls. However, this method is not effective when the aluminum sheet is relatively thick (e.g., 0.5 mm) or is composed of less pure and less flexible aluminum.

Thus, there remains a need for a method of separating metal sheet-thermoplastic resin laminate composites into their component metal sheet(s) and thermoplastic resin sheet. There also remains a need for suitable apparatus to carry out such a method.

SUMMARY OF THE INVENTION

Accordingly, it is one object of the present invention to provide a novel method for separating metal sheet-thermoplastic resin laminate composites into their component metal sheet(s) and thermoplastic resin sheet.

It is another object of the present invention to provide such a method of separating metal sheet-thermoplastic resin composites which effectively separates even relatively thick metal sheets.

It is another object of the present invention to provide such a method of separating metal sheet-thermoplastic resin composites which effectively separates even relatively inflexible metal sheets.

It is another object of the present invention to provide a novel apparatus for separating metal sheet-thermoplastic resin laminate composites into their component metal sheet(s) and thermoplastic resin sheet.

It is another object of the present invention to provide a novel method of recycling metal sheet-thermoplastic resin laminate composites which employs such a method of separating.

It is another object of the present invention to provide a novel method of recycling metal sheet-thermoplastic resin laminate composites which employs such an apparatus.

These and other objects, which will become apparent during the following detailed description, have been achieved by the inventors' discovery that metal sheet-thermoplastic resin laminate composites may be effectively separated into their component metal sheet(s) and thermoplastic resin sheet by a process involving:

(i) pressing a metal sheet-thermoplastic resin laminate composite having a metal surface between a first roller and a second roller, said first roller and said second roller forming a pair of opposing rollers, wherein said metal surface makes contact with said first roller and said first roller is an embossing roller having projecting pins, to obtain a metal sheet-thermoplastic resin laminate composite having a metal surface with impressions; and (ii) heating said metal sheet-thermoplastic resin laminate composite having a metal surface with impressions at a temperature and for a time sufficient to separate said metal sheet and said thermoplastic resin.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
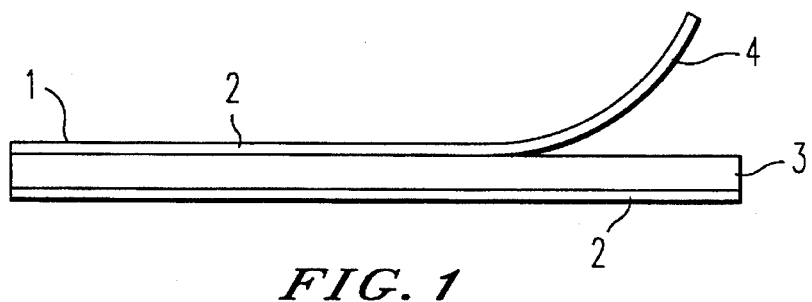
FIG. 1 shows a metal sheet-thermoplastic resin laminate composite, a portion of which has been separated by the present method.

Thus, in a first embodiment, the present invention provides a method for separating metal sheet-thermoplastic resin laminate composites into their component metal sheet(s) and thermoplastic resin sheets. In this method, the metal sheet may be formed of any of various metals such as aluminum, iron, copper, tin, steel, and the like. Aluminum and iron are preferred, and aluminum is particularly preferred. Although there is no particular constraint on the thickness of the metal sheet, such sheets usually have a thickness of 0.01 to 2 mm, more typically 0.1 to 0.8 mm.

Although it is possible to recycle metal sheet-thermoplastic resin laminate composites which contain only one metal sheet by the present method, more typically the laminate will comprise a thermoplastic resin sheet or core sandwiched between two metal sheets.

The exterior or exposed surface of the metal sheet(s) (the surface of the metal sheet opposite to the surface which is in contact with the thermoplastic resin sheet) may be coated with any conventional coating, such as a paint, so long as the coating does not adversely affect the present method.

The resin sheet or core may be composed of any resin suitable for use in metal sheet-thermoplastic resin laminate composites. Such resins are described in U.S. Pat. No. 4,994,130, which is incorporated herein by reference. Suitable resins include, for example, polyethylene, polypropylene, polybutene, polyvinyl chloride, polystyrene, polyamide, polyethylene terephthalate, polybutylene terephthalate, and polycarbonate. From the viewpoint of the extrusion molding properties, it is preferred to employ a polyolefin synthetic resin such as polyethylene, polypropylene, or polybutene. As such a thermoplastic resin, not only a virgin material, but also a recovered material or recycled material may be used in the form of a sheet. To such a thermoplastic resin, a foaming agent, a flame retardant, a filler, a coloring agent, etc. may be incorporated as the case requires. Good results have been achieved when the resin sheet or core is a low density polyethylene. Typically, the resin core will contain 0.05 to 0.4 wt. % of carbon black, more typically 0.1 to 0.3 wt. % of carbon black, based on the total weight of the resin core, to inhibit UV decomposition of the resin core.

The metal sheet(s) may be laminated with the resin sheet or core by means of an adhesive laminating film, disposed between the resin sheet or core and the metal sheet. Typically, the adhesive film is a modified polyolefin resin such as those described in U.S. Pat. No. 4,762,882, which is incorporated herein by reference.

Suitably, the resin core is 1 to 10 mm thick, preferably 2 to 5 mm thick. The adhesive film is suitably 10 to 100 μm thick, preferably 15 to 50 μm thick.

Taking into account the above-described thicknesses for the metal sheet(s) and thermoplastic resin sheet or core, the overall thickness of the laminate composite is usually 1 to 12 mm, more typically 2 to 6 mm, in the case of a laminate composite comprising one metal sheet, and usually 1 to 14 mm, more typically 3 to 8 mm, in the case of a composite comprising two metal sheets sandwiched about a resin core.

Although there is no limitation on the length and width of the laminate composites which can be separated by the present method, the laminate composites will typically have a length of 0.5 to 10 m, more usually 2 to 7 m, and a width of 0.5 to 2 m, more usually 1.2 to 1.6 m.

In the first step, the metal sheet-thermoplastic resin laminate composite to be separated is pressed between a pair of opposing rollers such that the roller(s) which contacts the metal sheet(s) is an embossing roller. Thus, when a composite having two metal sheets sandwiched about a thermoplastic resin core is being separated both rollers will be picking rollers. On the other hand, when a composite containing a single metal sheet laminated on a thermoplastic resin sheet is being separated, only the roller making contact with the metal sheet needs to be an embossing roller.

By embossing roller, it is meant a roller which is covered with projecting pins or fingers. Suitably such pins are about 1 to 3 mm tall, preferably 1.9 to 2.3 mm tall. The pins are suitably regularly spaced on the surface of the roller with a pin head-to-pin head distance of 3.3 to 10 mm, preferably 4 to 8 mm. Suitably, the density of the projecting pins on the surface of the picking roller is 1 to 12, preferably 3 to 5, pins/cm$^2$. Suitably, the pins have a sharp or pointed head. The pins may be in the shape of cones.

The distance or gap between the rollers will depend on the thickness of the laminate being separated. The distance between the rollers is usually chosen so that the pins will make an impression of 1 to 2 mm, preferably 1.2 to 1.5 mm, deep on the surface of the metal sheet. It is important that the pins not break the surface of the metal sheet. Thus, e.g., for a laminate comprising two aluminum sheets each having a thickness of 0.1 to 0.5 mm sandwiched around a polyethylene core having a thickness of 2 to 5 mm, the distance between the rollers should be selected such that the distance between pin heads on opposing rollers is 0.2 to 3 mm, preferably 0.3 to 2.4 mm, at their closet approach. The pressure applied on the rollers should be sufficient to ensure that the metal surface(s) on the laminate existing from the rollers has the desired impressions.

In the second step, the laminate is heated to separate the metal sheet(s) from the thermoplastic resin sheet or core. The heating may be carrier out in any conventional way provided that the metal surface is heated without heating the thermoplastic resin above its glass transition temperature, $T_g$. Thus, when separating laminates which contain a single metal sheet laminated on a thermoplastic resin core heat is supplied only to the exposed metal surface. On the other hand, when separating a laminate which contains two metal sheets sandwiched about a thermoplastic resin core, heat and shear should be applied to both metal surfaces.

The source of heat may be any conventional heat source such as an open flame, electric coils, heated rollers, etc. provided that the heat source is capable of rapidly heating the metal surface without heating the thermoplastic resin core to a temperature above its $T_g$. Thus, infrared heating sources may not be suitable, because they may result in excessive heating of the thermoplastic sheet or core. For example, when using an open flame, good results have been achieved using a flame temperature of about 1500° F. and exposing the metal surface to that temperature for about 1 sec. Good results have been achieved using a sectional high capacity ribbon burner such as that sold by Ensign Ribbon Burners, Inc. of Pelham Manor, N.Y.

After the heating step, the laminate composite spontaneously separates into its component metal sheet(s) and thermoplastic resin sheet or core as the laminate composite cools. The separated metal sheet(s) and thermoplastic resin sheet or core may then be recycled. For example, the metal sheet(s) may be melted and reformed into various other articles or new metal sheet, which can be used to prepare new laminate composite. Similarly, the thermoplastic resin core can be used to form new laminate composite.

The present invention also provides novel apparatus for carrying out the present method. The apparatus of the present invention comprises a first roller and a second roller which together form a pair of opposing rollers. At least one of the first and second rollers is an embossing roller having projecting pins as described above. When separating a laminate composite having two metal sheets sandwiched about a resin core, both the first and second rollers will be embossing rollers.

The apparatus also comprises a heating zone which contains a heat source, which is positioned downstream from the first and second rollers. The heating source may be any of those discussed above.

Although the laminate composite may be forced through the gap between the first and second rollers and on through the heating zone by the action of the first and second rollers themselves, it is preferred that the present apparatus comprise additional means for passing the laminate composite through the gap between the first and second rollers and the heating zone. Examples of such means for passing the laminate through the gap between the opposing rollers and on through the heating zone include pulling rollers, conveyor belts, etc.

It is also to be understood that the apparatus may take the form of two separate units, which contain the first and second rollers and the heating zone, separately. That is, a first unit would contain the first and second rollers and a second unit would contain the heating zone. It is also to be understood that these units may contain separate and independent drive mechanisms. In this case, the apparatus will contain means for conveying the laminate from the first unit to the second unit.

The present apparatus may further comprise cutting means before the pair of opposing rollers to trim the laminate to a suitable length and/or width prior to passing between the opposing rollers. Suitable cutting means include flying saws, saws, chopping blades, etc. The present apparatus may also comprise take up rollers for collecting the separated metal sheet(s) or resin sheet or core or means for reducing the size of the separated metal sheet(s) and/or resin sheets or core, such as choppers, saws, shredders, etc., positioned downstream from the heating zone.

Referring now to the drawings, wherein like reference numerals designate identical or corresponding parts throughout the several views, and more particularly to FIG. 1 thereof, it is seen that the present process results in the efficient separation of the metal sheet from the thermoplastic resin. FIG. 1 shows a metal sheet-thermoplastic resin laminate composite (1) of which one surface has been partly treated by the present process. Thus, the metal sheet which has not been treated (2) remains bound to the resin core (3), while the portion of the metal sheet which has been embossed and heated (4) has separated from the resin core (3).

Figure 2:
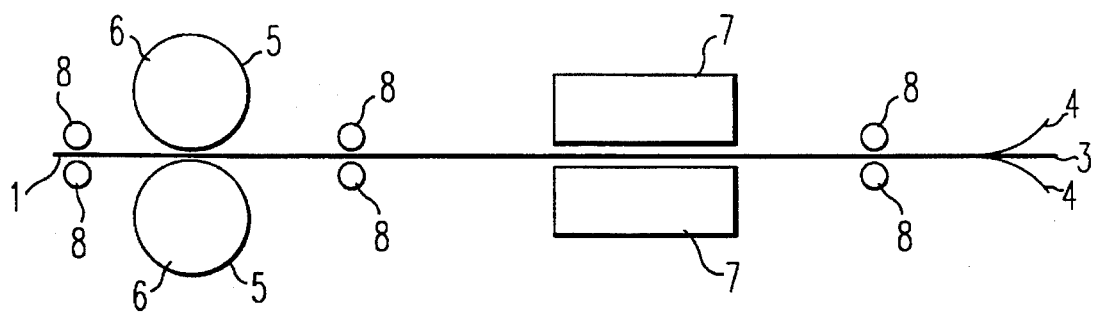
FIG. 2 shows one embodiment of the present apparatus.

Referring now to FIG. 2, it is seen that the apparatus of the present invention comprises a pair of rollers (5) both of which are embossing rollers (6). The apparatus further comprises a heating zone (7). In a preferred embodiment, the apparatus comprises additional pulling rollers (8) to move the composite through the apparatus. The metal sheet-thermoplastic resin laminate composite (1) passes through the embossing rollers (5, 6) and on through the heating zone (7) being pulled by the pulling rollers (8). When the metal sheet-thermoplastic resin composite emerges, it separates spontaneously into its component metal sheets (4) and resin core (3) upon cooling.

Figure 3A:
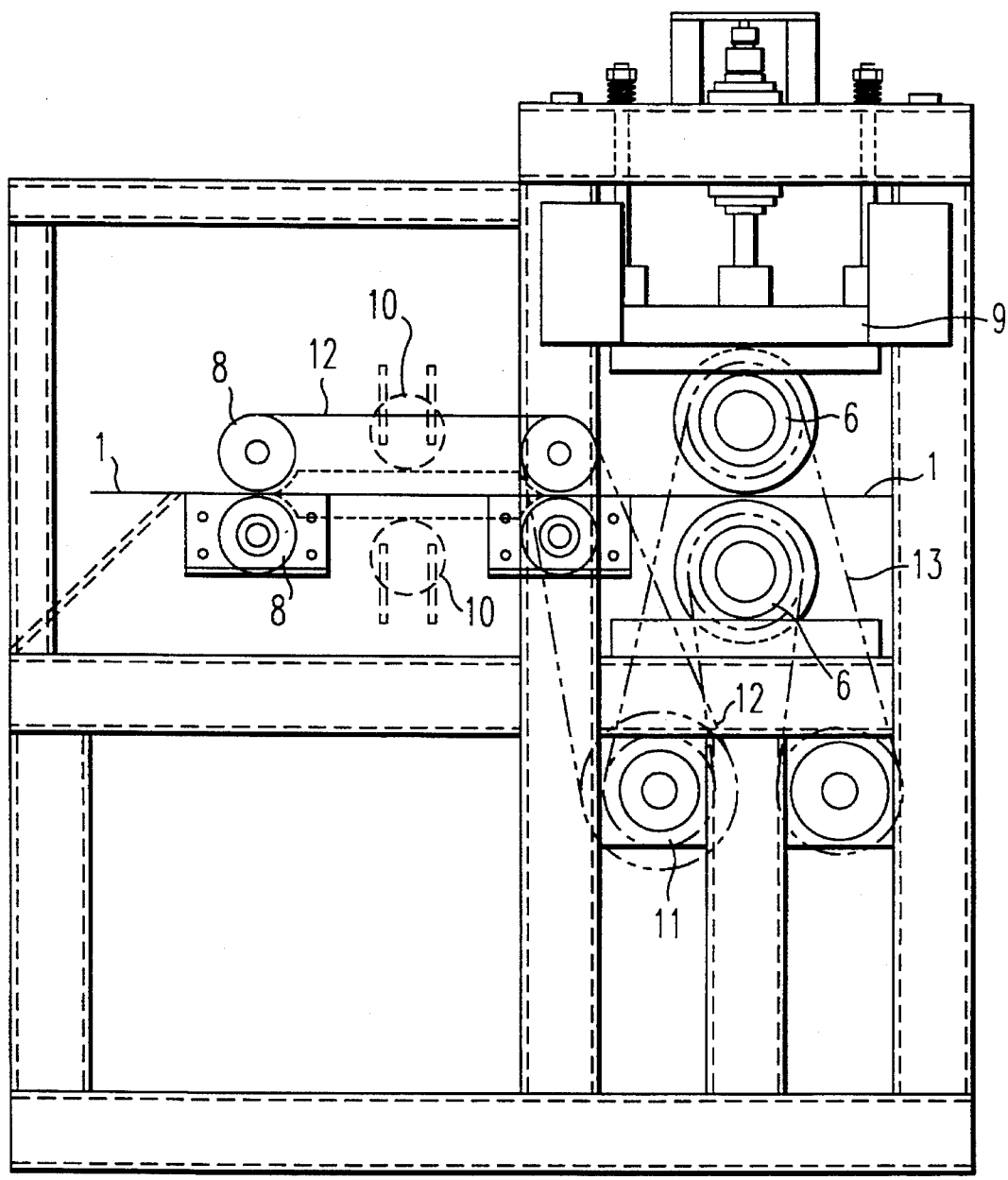
FIGS. 3a and b show another embodiment of the present apparatus.
Figure 3B:
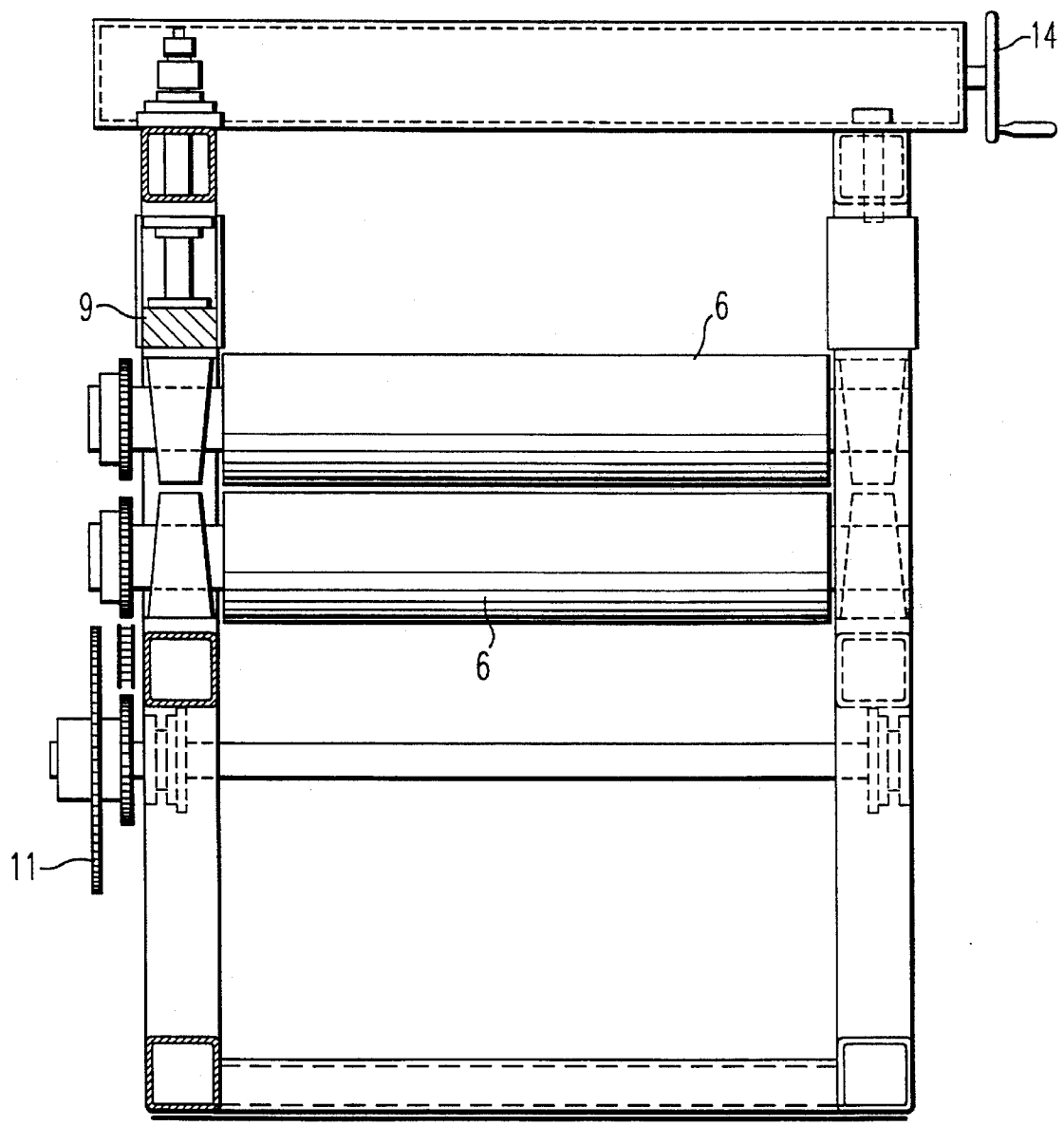

Another embodiment of the present apparatus is shown in FIGS. 3a and 3b, in which a press (9) is used to apply pressure on the embossing rollers (6). The metal sheet-thermoplastic resin laminate (1) passes through the embossing rollers (6) and is conveyed between a pair of ribbon burners (10) by means of pulling rollers (8) powered by a power roller (11) via a belt (12). The same power roller (11) powers the embossing rollers (6) by belt (13). The distance between the embossing rollers may be controlled by wheel (14). FIG. 3a is a side view of the apparatus, and FIG. 3b is an end on view of the apparatus.

Figure 4A:
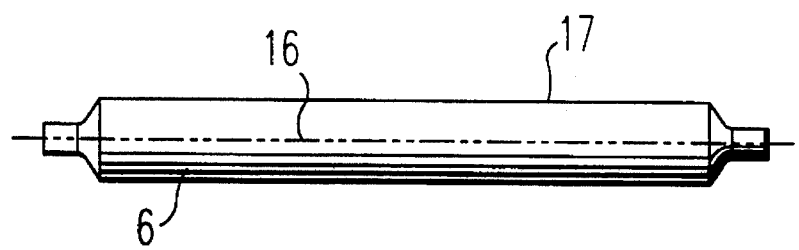
FIGS. 4a, b, and c show one embodiment of an embossing roller used in the present method and apparatus.
Figure 4B:
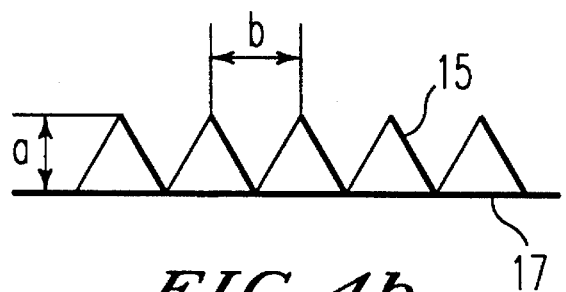
Figure 4C:
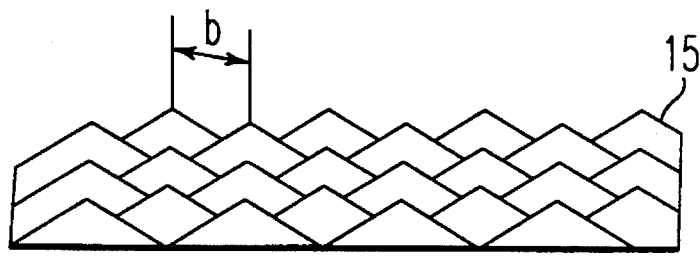

FIGS. 4a, b, and c show a preferred embodiment of the embossing roller used in the present method and apparatus. In FIG. 4a, the embossing roller (6) has a cylindrical surface (17) which is covered entirely with projecting pins (15). FIG. 4b shows a preferred arrangement of projecting pins (15) on an enlarged section of the embossing roller (6). The projecting pins (15) are cones raised to a height (a) above the surface (17). The projecting pins (15) are arranged in rows with a pin head-to-pin head distance of (b). FIG. 4c shows an enlarged section of the embossing roller in which the rows of projecting pins (15) are seen to run parallel to the long axis (16) of the embossing roller (6) and are staggered.

Other features of the invention will become apparent in the course of the following descriptions of exemplary embodiments which are given for illustration of the invention and are not intended to be limiting thereof.

EXAMPLES

This example was carried out using the apparatus shown in FIGS. 3a and b. The metal sheet-thermoplastic resin laminate was of the sandwich type in which two sheets of aluminum were sandwiched about a core of low density polyethylene containing 0.2 wt % of carbon black. The metal sheet-thermoplastic resin laminate was fed through the apparatus at a rate of 6.9 feet/minute, and the heating source was a natural gas sectional high capacity ribbon burner sold by Ensign Ribbon Burners, Inc. of Pelham Manor, N.Y. The length of the two embossing rollers was 36", and the diameter of the rollers was 8". The projecting pins on the embossing rollers were cones having a height (a) of 0.088" arranged as shown in FIG. 4c with the pin head-to-pin head distance, (b), being 0.2". Two trials were run;

| Trial 1: | |
| --- | --- |
| Metal Sheet-Thermoplastic Resin Laminate Thickness | 3 mm |
| Aluminum Sheet Thickness | 0.5 mm |
| Polyethylene Sheet Thickness | 2 mm |
| Gap Between Embossing Rollers | 0.5 mm |
| Trial 2: | |
| Metal Sheet-Thermoplastic Resin Laminate Thickness | 4 mm |
| Aluminum Sheet Thickness | 0.5 mm |
| Polyethylene Sheet Thickness | 3 mm |
| Gap Between Embossing Rollers | 1.5 mm |

In both trials, good separation of the aluminum sheets from the polyethylene core was achieved.

Comparative Example

The same metal sheet-thermoplastic resin laminates treated in the above-given Example were treated in a process using the same heater and embossing rollers with the exception that the laminate was heated first and then passed between the rollers. No satisfactory separation between the metal sheets and the thermoplastic resin core was observed. In addition, the same metal sheet-thermoplastic resin laminates were heated with an infra-red heater and then passed between the embossing rollers. Again, the separation of the metal sheets from the resin core was not satisfactory.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A two-stage method for separating a metal sheet-thermoplastic resin laminate composite into separated metal sheet and thermoplastic resin, comprising:
   (i) pressing a metal sheet-thermoplastic resin laminate composite having a metal surface between a first roller and a second roller, said first roller and said second roller forming a pair of opposing rollers, wherein said metal surface makes contact with said first roller and said first roller is an embossing roller having projecting pins, to obtain a metal sheet-thermoplastic resin laminate composite having a metal surface with impressions; and
   (ii) thereafter heating said metal sheet-thermoplastic resin laminate composite having a metal surface with impressions at a temperature and for a time sufficient to separate said metal sheet and said thermoplastic resin.

2. The method of claim 1, wherein said metal sheet is composed of a metal selected from the group consisting of aluminum, iron, copper, tin, and steel.

3. The method of claim 1, wherein said metal sheet is composed of a metal selected from the group consisting of aluminum and iron.

4. The method of claim 1, wherein said metal sheet is composed of aluminum.

5. The method of claim 1, wherein said metal sheet has a thickness of 0.01 to 2 mm.

6. The method of claim 1, wherein said metal sheet has a thickness of 0.1 to 0.8 mm.

7. The method of claim 1, wherein said thermoplastic resin is composed of a resin selected from the group consisting of polyethylene, polypropylene, polybutene, polyvinyl chloride, polystyrene, polyamide, polyethylene terephthalate, and polycarbonate.

8. The method of claim 1, wherein said thermoplastic resin is composed of a resin selected from the group consisting of polyethylene, polypropylene, and polybutene.

9. The method of claim 1, wherein said thermoplastic resin is low density polyethylene.

10. The method of claim 1, wherein said thermoplastic resin comprises carbon black.

11. The method of claim 1, wherein said thermoplastic resin has a thickness of 1 to 10 mm.

12. The method of claim 1, wherein said thermoplastic resin has a thickness of 2 to 5 mm.

13. The method of claim 1, wherein said metal sheet, in said laminate composite, is laminated to said thermoplastic resin by an adhesive film.

14. The method of claim 1, wherein said projecting pins have a height of 1 to 3 mm.

15. The method of claim 1, wherein said projecting pins have a height of 1.9 to 2.3 mm.

16. The method of claim 1, wherein said projecting pins are regularly spaced on said first roller and the density of projecting pins on said first roller is 1 to 12 pins/cm$^2$.

17. The method of claim 16, wherein said density of projecting pins on said first roller is 3 to 5 pins/cm$^2$.

18. The method of claim 1, wherein said first roller and said second roller are separated by a distance which is sufficient to result in said impressions having a depth of 1 to 2 mm.

19. The method of claim 1, wherein said first roller and said second roller are separated by a distance which is sufficient to result in said impressions having a depth of 1.2 to 1.5 mm.

20. The method of claim 1, wherein said metal sheet-thermoplastic resin laminate composite comprises a metal sheet laminated on each of opposite surfaces of a thermoplastic resin sheet, and wherein said second roller is a picking roller having projecting pins.

* * * * *